Aug. 11, 1959  L. V. TIMMS  2,899,077
COMPRESSION HOLDER FOR ELONGATED OBJECTS
Filed Aug. 30, 1954

INVENTOR
LOUISE V. TIMMS
BY *Bair, Freeman & Molinare*
ATTORNEYS

United States Patent Office 2,899,077
Patented Aug. 11, 1959

2,899,077

COMPRESSION HOLDER FOR ELONGATED OBJECTS

Louise Virgillia Timms, River Grove, Ill.

Application August 30, 1954, Serial No. 452,989

5 Claims. (Cl. 211—60)

The primary object of my invention is the provision of a compression holder for supporting generally elongated objects having rigid spaced parallel members, at least one of which carries a cushioning or padding material projecting into the space between said parallel members, the padding material being made from cellular rubber reinforced with ribs having a compression resistance greater than the cellular rubber.

This and other objects will become apparent from the following description and the appended claims.

Figure 1:
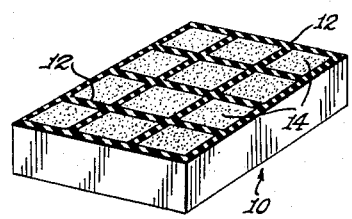
Figure 1 is a perspective view of a laminated cushion structure made in accordance with my invention.

Referring to Figure 1, the numeral 10 designates generally a laminated resilient pad or cushion consisting of a latticework of upstanding ribs 12 made from solid sheet rubber, the spaces formed by said ribs being filled with cellular rubber-like material adhered to the ribs. The cellular material is readily compressible and may be made from natural rubber, synthetic rubbers such as Buna S, Buna N, polychloroprene, plasticized vinyl resins or the like, prepared in one of several cellular forms. For example, where porosity and breathability are desired the cellular rubber-like material may be made from compounded latex (synthetic or natural) into which air has been whipped. The latex froth thus prepared is gelled and vulcanized to form a resilient, spongy, porous cushion in accordance with well known practice. The cellular material may also be made by chemically blowing very soft, milled, solid rubber composition. Suitable chemical blowing agents are available which evolve large quantities of gaseous nitrogen or carbon dioxide or the like to blow or expand the rubber into cellular form. This operation is usually carried out in a press and the final product is not freely breathable or porous as is the case when the rubber is made by whipping liquid latex. Closed cell, or unicellular rubber which is not at all air pervious may also be employed. It will be understood the terms "cellular rubber-like material" and "cellular rubber" as used in this specification and the appended claims, includes any cellular lightweight elastic organoplastic substances which resemble cellular rubber in physical properties.

Cellular rubber of the desired compression resistance (density) is built up into the construction shown in Figure 1 by combining with regularly-shaped solid rubber ribs made from a rubber stock having a relatively high modulus of rigidity and high resistance to compression. The combination of the relatively soft, easily-compressible sponge rubber blocks separated by such ribs increases the compression resistance or firmness of the cushion as a whole without substantially increasing the weight.

When foam rubber, or other porous cellular rubber, is employed, the cushion is breathable, which, of course, is an important characteristic for a cushion to be used in upholstery. The presence of the solid rubber ribs prevents "bottoming" under heavy loads or sharp impacts without increasing the density of the foam. In order to obtain comparable compression resistance by increasing the density of the foam, the porosity or breathability of the foam must be proportionately reduced. The resilient ribs accomplish this purpose without any significant reduction in breathability because the cross-sectional area occupied by the ribs comprises a very small proportion of the total cross-sectional area of the cushion.

The compression resistance offered by a composite construction of this type is different from that offered by a material which is homogeneous, such as a solid piece of rubber, either cellular or non-cellular. By increasing the compression resistance over the very small, uniformly spaced areas defined by the top edges of the ribs, the compression of the cushion is increased, but without the feeling of "hardness" of a single resilient material which provides uniform compression resistance over the entire supporting surface of the cushion.

The ribs need not be made from solid rubber. It is essential only that the ribs be resilient and that the compression resistance of the material from which they are made is greater than the compression resistance of the cellular rubber blocks therebetween. The ribs must, of course, be yielding but usually considerably less yielding than the cellular rubber. A very dense sponge rubber, or a dense sponge rubber reinforced with fabric, may be used instead of a solid sheet rubber. Materials other than rubber, such as synthetic plasticized resins or synthetic elastomers are also satisfactory, providing they take no permanent set upon deformation under a compressive load. The cushion, to operate properly, must be capable of assuming its original shape rather quickly after the compressive force has been released.

The cushion of Figure 1 may be prepared by cutting blocks of cellular rubber to the desired size and cementing the rubber ribs 12 thereto with any suitable adhesive. Latex-base adhesives have been found to be particularly satisfactory because they give good adhesion and can be applied by spraying so that large areas can be covered in a minimum of time. If desired, the adhesive may be applied by brushing or immersing in an adhesive bath. Another method of preparing the construction of Figure 1 is by molding the rib latticework in one piece, pouring frothed compound latex into the spaces between the ribs, and gelling and vulcanizing the foam latex.

The configuration the ribs may take within the cushion is not critical, but it is desirable that the ribs stand parallel to the direction of the compressive force to be applied to the cushion in use. The ribs should be uniformly spaced if the cushion is to provide uniform compression resistance over its entire supporting surface. Of course, where increased compression resistance is desired in a limited area, this may be achieved by increasing the frequency of the ribs in that area.

The rib-reinforced cushion construction of the invention need not be employed to increase the firmness of the cellular rubber cushion, but may be used to provide the same firmness with a decrease in the density of the cellular rubber. Decreasing the density permits a decrease in the cost of the rubber and an increase in the porosity of air perviousness.

Figure 2:
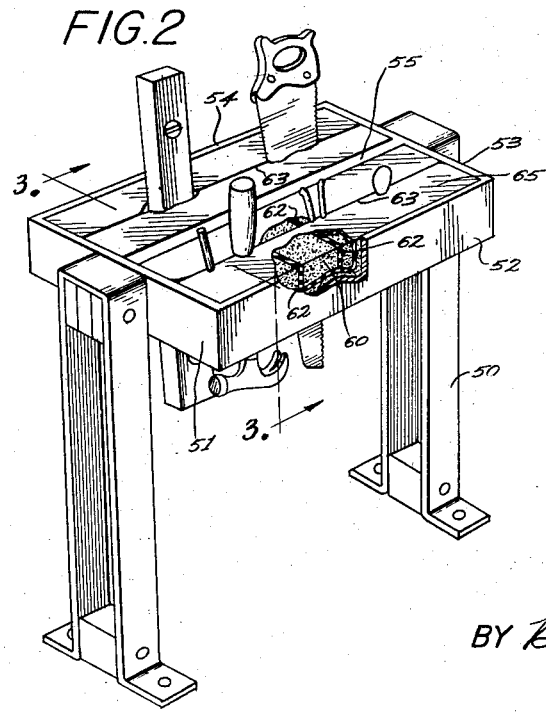
Figure 2 is a perspective view of a compression holder which utilizes the novel laminated resilient padding of my invention.
Figure 3:
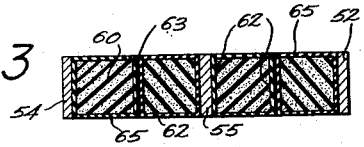
Figure 3 is a sectional view along the line 3—3 of Figure 2.

Figures 2 and 3 illustrate a compression holder employing my padding construction for the jaws thereof.

The holder is supported by uprights 50, the upper ends of which support a frame consisting of parallel sides 52 and 54 and parallel ends 51 and 53. The frame is rectangular in shape and is divided into two equal portions by longitudinally-extending member 55. The inner faces of the frame members 52 and 55, comprising one-half the frame, are covered with a ribbed cushion or padding made in accordance with my invention. The inner faces of members 54 and 55 are similarly covered to provide a second holder portion. The cushion structure comprises a line of sponge rubber blocks 60 spaced laterally from each other by resilient ribs 62 having a compression resistance greater than the compression resistance of the sponge rubber. The ribs stand perpendicular to the inner faces of frame members 52, 55 and 54, and may oppose corresponding ribs in the cooperating jaw or may be staggered with respect thereto. A suitable cover 65 is placed around the padding, covering the three exposed surfaces to prevent abrasion of the sponge by articles placed between the jaws of the holder. This cover may be a coated fabric, a plain fabric, or it may be a sheet of rubber similar to that used for ribs, as shown in the drawing. The cover may be employed to modify the compression characteristics of the padding, if desired. For example, rubber is more difficult to compress than a fabric of equal thickness. This fact should be taken into consideration in designing the padding.

The opposed cushion members, with their covers 65, abut along the line 63. Objects to be held in the device may be inserted at any point along this line.

As indicated, the inner surfaces of the frame member 54 and the opposite sides of the frame member 55 also carry padding which is identical in construction to that just described. The holder thus has twice the capacity of one having only a single pair of jaws. It should be pointed out that it is not absolutely necessary that resilient padding be used on both opposed surfaces. For some purposes the performance of the holder is satisfactory where one surface is rigid and the opposed surface compressible.

For illustration purposes, tools are shown inserted between the padded members, but it will be understood that any elongated object can be inserted and held by the holder. The objects may be inserted and removed with little effort, but remain securely in place while between the jaws.

The combination of cellular rubber-like blocks separated by upstanding ribs is peculiarly the only type of resilient construction I have found that will satisfactorily hold thin, heavy objects as well as thicker articles. It will be obvious that articles which are relatively thick will compress the jaws to a greater extent than thin articles, and consequently, the opposing force exerted by the padding will be increased to hold the article more firmly within the jaws of the holder. On the other hand, where an article is relatively thin, the compression resistance offered by the jaws is correspondingly reduced. Thin, dense objects have been found difficult to lodge securely within the jaws of a holder having pads of a single, uniformly compressible material. By reinforcing the cellular rubber-like material with ribs having a relatively high compression resistance, I have provided a holder that not only supports relatively thick objects, but which will support thin, denser objects as well.

From the foregoing description it is apparent that the invention provides a novel compression pad construction that may be used for many cushioning and shock-absorbing applications. It is especially useful for gym mats, crash padding, camping equipment, sports gear and for padding shipments in glass containers. In accordance with the use, the compression characteristics may be varied. This may be done by combining cellular materials of different densities with ribs of varying thickness or location within the cushion. The modulus of elasticity and rigidity of the stock from which the ribs are made can also be controlled to modify the compressive properties of the cushion. It will be appreciated that my invention is susceptible of many modifications, and it is my intention not to limit the invention other than as necessitated by the scope of the appended claims.

I claim as my invention:

1. In a compression holder for elongated objects, opposed rigid spaced parallel members, at least one of which is covered with a cushioning material to substantially close the space between said rigid members, said cushioning material comprising a slab of cellular rubber-like material reinforced with spaced upstanding parallel ribs, said ribs being perpendicular to said parallel members and being made from a resilient material having a compression resistance greater than the compression resistance of the cellular material, thereby offering firm lateral holding pressure against objects inserted between said parallel members to hold the same without additional support.

2. The compression holder of claim 1 in which both of the opposed faces of said spaced parallel members are covered with said cushioning material.

3. The compression holder of claim 1 in which both of the opposed faces of said spaced parallel members are covered with said cushioning material, the ribs in opposed cushioning material being aligned.

4. In a compression holder for elongated objects, a pair of rigid spaced parallel members at least one of which is covered with a cushioning material to substantially close the space between said rigid members comprising a slab of cellular rubber-like material reinforced with a honeycomb network of upstanding parallel ribs, said ribs being made from solid rubber sheet stock having a compression resistance greater than the compression resistance of the cellular material, thereby offering firm lateral holding pressure against objects inserted between said parallel members to hold the same without additional support.

5. The compression holder of claim 1 in which both of the opposed faces of said spaced parallel members are covered with said cushioning material and the ribs in opposed cushioning material are staggered with respect to each other.

References Cited in the file of this patent

UNITED STATES PATENTS

| | | |
|---|---|---|
| 1,659,371 | Merrill | Feb. 14, 1928 |
| 1,876,284 | Fried | Sept. 6, 1932 |
| 1,961,745 | Eckhardt | June 5, 1934 |
| 1,988,843 | Heldenbrand | Jan. 22, 1935 |
| 2,061,569 | Fischer | Nov. 24, 1936 |
| 2,065,522 | Fischer | Dec. 29, 1936 |
| 2,121,307 | Swift | June 21, 1938 |
| 2,301,596 | Wells | Nov. 10, 1942 |
| 2,511,735 | Patterson | June 13, 1950 |
| 2,575,764 | Morner | Nov. 20, 1951 |
| 2,774,481 | Sievers et al. | Dec. 18, 1956 |

FOREIGN PATENTS

| | | |
|---|---|---|
| 782,886 | France | Mar. 25, 1935 |
| 446,300 | Great Britain | Apr. 28, 1936 |
| 47,034 | France | Aug. 31, 1936 |
| 800,242 | Germany | Oct. 17, 1950 |